United States Patent [19]
Fromson et al.

[11] Patent Number: 5,693,207
[45] Date of Patent: Dec. 2, 1997

[54] CATALYST PREPARATION

[75] Inventors: Howard A. Fromson, 49 Main St., Stonington, Conn. 06378; William J. Rozell, Vernon, Conn.

[73] Assignee: Howard A. Fromson, Stonington, Conn.

[21] Appl. No.: 502,121

[22] Filed: Jul. 13, 1995

[51] Int. Cl.⁶ .................... C25D 11/04; B01J 21/04
[52] U.S. Cl. .................... 205/112; 205/173; 427/304; 427/305; 427/437; 502/439
[58] Field of Search .................... 427/271, 304, 427/305, 306, 405, 437; 502/439; 428/209; 205/112, 173

[56] References Cited

U.S. PATENT DOCUMENTS

| | | | |
|---|---|---|---|
| 3,764,564 | 10/1973 | Maselli et al. | 252/465 |
| 3,929,594 | 12/1975 | Fromson | 204/42 |
| 4,014,756 | 3/1977 | Fromson | 204/10 |
| 4,021,592 | 5/1977 | Fromson | 428/209 |
| 4,954,370 | 9/1990 | Mahmoud | 427/438 |
| 4,994,422 | 2/1991 | Goldman | 502/5 |
| 5,380,696 | 1/1995 | Sawada et al. | 502/313 |

*Primary Examiner*—Glenn A. Caldarola
*Assistant Examiner*—Bekir L. Yildirim
*Attorney, Agent, or Firm*—Alix, Yale & Ristas, LLP

[57] ABSTRACT

A substrate metal such as aluminum or titanium, usually in the form of a web, is anodized to form a porous unsealed oxide coating. An inexpensive core metal such as copper or chromium is then electrodeposited in the pores of the oxide coating to form metal nodules extending above the oxide coating in a bulbous, undercut configuration. A second metal, usually an expensive catalytic metal, is deposited onto the surface of the core metal nodules by electro or chemical deposition. A large surface area of catalyst is formed with the use of a minimum amount of catalyst metal. The nodules may be liberated from the substrate metal surface by dissolving the oxide layer and releasing discrete particles to form a fine catalyst powder.

24 Claims, 2 Drawing Sheets

CATALYST PREPARATION

BACKGROUND OF THE INVENTION

This invention relates to a process for making coated metal particles with the particles either being attached to a metal base or being discrete particles. More particularly, the invention relates to a method of forming and coating attached particles with a selected material which may be a catalyst material. The attached coated particles may then be detached to form discrete coated particles.

U.S. Pat. Nos. 3,929,594 and 4,021,592 disclose an electroplated anodized aluminum article and a process for making such an article wherein an aluminum substrate has an unsealed porous anodic oxide layer formed on the substrate and then has a metal electrolytically deposited thereon to form discrete metal islands having a root portion anchored in the pores of the oxide layer. The islands extend from the root portion above the surface of the oxide layer in a bulbous, undercut configuration. It is disclosed that the article in these patents can be a composite catalyst body by using a catalytically active metal to form the islands which then serves as a catalyst, along with the catalytically active aluminum oxide layer that was formed on the aluminum substrate. U.S. Pat. No. 4,014,756 discloses that the formed metal islands can be liberated from the aluminum substrate to form metal powders by dissolving away the anodic oxide layer thereby releasing the islands and forming the powder.

The problem with forming catalysts according to the prior art such as U.S. Pat. Nos. 3,929,594 and 4,021,592 is that some of the catalytically active metals which can be used to form the metal islands in the previously mentioned patents are rare and expensive such as palladium, platinum, ruthenium, rhodium and other noble metals, as well as rare earth metals.

SUMMARY OF THE INVENTION

The present invention is directed to the formation of a catalytic surface wherein a base metal, such as aluminum or titanium, is anodized to form a porous unsealed oxide coating. Nodules are then formed in the pores of the coating by electrodepositing a relatively inexpensive core metal such that the nodules extend above the surface in a bulbous, undercut configuration. A second relatively expensive catalytic metal is subsequently deposited onto the surface of the core metal nodules by either an electrodeposition process or by electroless chemical deposition. A large surface area of catalyst is thereby formed with the use of a minimum amount of catalyst metal. The article so prepared is suitable for use as a catalytic surface. The nodules may be liberated from the base metal surface by dissolving or otherwise removing the oxide layer to release discreet particles and form a catalyst powder.

DESCRIPTION OF THE PREFERRED EMBODIMENT

According to the first step of the present invention, a porous anodic oxide coating is formed on the surface of a base metal plate, web or other shaped article preferably made of titanium, aluminum or aluminum bonded to another material such as steel. The base metal may be ungrained (smooth) or it may be grained to form a pitted surface by conventional graining techniques. The formation of porous anodic oxide coatings in the anodizing process is well known in the art and is accomplished by using the known electrolytes which result naturally in porosity such as sulfuric acid, phosphoric acid and chromic acid to name a few. Nodules ranging in size from several microns to sub-micron are then formed by electrodepositing a platable metal into the pores. The metal nodules are discrete, individual islands of metal projecting above the anodic oxide coating. The metal nodules then have a different metal coating, preferably a catalyst metal, electrodeposited over the surface of the metal nodules to form the desired particles.

The pore size of an unsealed anodic oxide coating on an aluminum article can be made to vary in diameter and depth by varying the anodizing conditions as is known in the art. For purposes of the present invention, it is preferred to form an anodic oxide layer having pores with a diameter in the range of about 50 to 300 Angstroms. Since there are 10,000 Angstroms in a micron, sub-micron metal particles can easily be formed according to the present invention. A desired particle size range can be attained by control of the anodizing and electrodeposition processes.

The process of the invention can be carried out so as to form the catalytic surface on a prefabricated finished part. This application is suited to the use of titanium or aluminum bonded to steel where structural strength is a prerequisite. It may be further desirable to treat the article prepared on a base comprised of aluminum bonded to steel such that the aluminum oxide is converted to the more catalytically active gamma form. This treatment can be accomplished, for example, by calcination at temperatures above 300° C. In this way, a multifunctional catalyst is obtained containing both the plated metal catalyst or the catalytic oxide of the plated metal on the nodules and the gamma alumina.

The process of the present invention can be carried batchwise or alternatively carried out continuously, using for example, a metal web of a suitable thickness which is continuously anodized, plated with the first metal and plated with the catalyst metal. In addition, the continuous process can include the dissolving of the anodic oxide coating to liberate the particles and the recycling of the aluminum web through the process.

Figure 1:
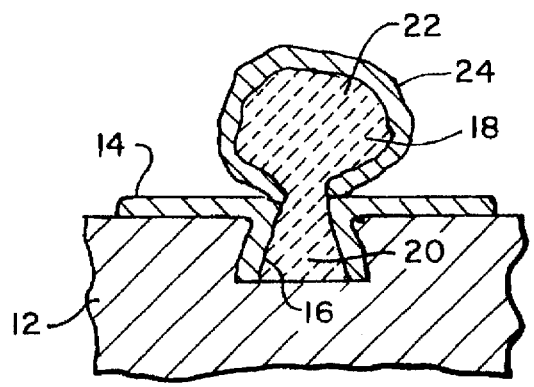
FIG. 1 is an enlarged cross-sectional view depicting a metal particle formed in a pore of an anodic oxide layer on a metal base plate and extending above the surface thereof with a catalyst metal coating thereon.

FIG. 1 shows a cross-section of a portion of an article formed according to the present invention. An anodizable metal substrate 12 such as aluminum or titanium has an unsealed, porous anodic oxide layer 14 formed therein with a pore being shown at 16. Electrolytically deposited metal such as copper or chromium is deposited in the pore 16 to form the nodule designated 18 having a root portion 20 in the pore 16 and a bulbous, undercut head portion 22 extending above the pore 16 and above the anodic oxide layer 14. Deposited onto the bulbous, undercut head portion 22 is a coating of the catalyst metal 24 such as platinum.

Figure 2:
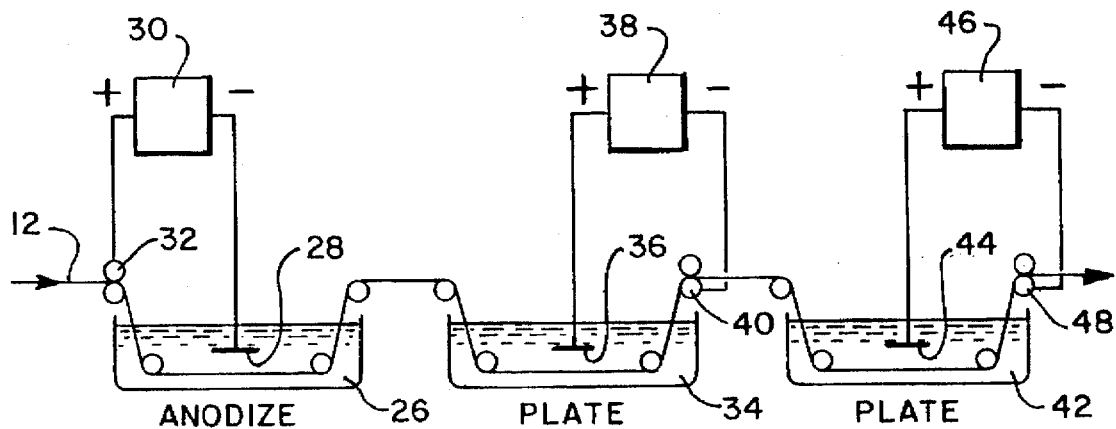
FIGS. 2, 2a and 3 are diagrammatic representations of several ways in which an aluminum web can be continuously anodized and plated to form metal particles according to the present invention.

The formation of the anodic oxide coating and the deposition of the metal into the pores of the anodic oxide coating can be accomplished using the known techniques as described in the previously mentioned U.S. Pat. Nos. 3,929,594 and 4,021,592. As taught by that prior art, various combinations and arrangements of anodizing cells, contact cells and plating cells can be employed. FIG. 2 illustrates an embodiment of the present invention employing one of these possible arrangements as an example. In the following description, an aluminum web, copper core metal and platinum catalyst metal will be used as examples, but it is to be recognized that other materials such as those previously mentioned can be employed.

Figure 2A:
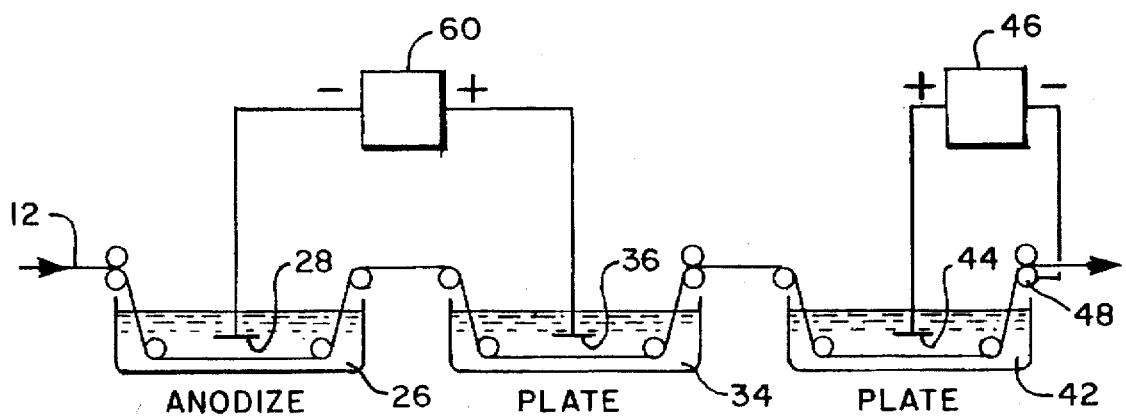

The aluminum web substrate 12 is first fed into the anodizing cell 26 having a cathode 28 connected to a source of direct current 30 and containing a standard anodizing electrolyte bath. The anodizing direct current from the source 30 is passed into the aluminum web through the contact roller 32. Alternately, the anodizing current can be passed into the web by means of a contact cell such as illustrated in the prior U.S. Pat. Nos. 3,929,594 and 4,014,756. One such arrangement is illustrated in FIG. 2a explained hereinafter.

Once the anodic oxide layer with an average thickness of approximately one micron has been formed, the anodized web is passed to the plating cell 34. In this plating cell 34 is an anode 36 of the platable metal selected for the core of the particles to be formed, such as copper. The cell contains an appropriate electrolyte and the anode 36 is connected to a source 38 of direct current power. The direct current source 38 is also connected to the contact roller 40 to pass the plating current through the web in the plating cell 34.

In the plating cell 34, the platable metal from the anode is deposited in the pores of the anodic oxide layer which first forms the root 20 of the nodule as illustrated in FIG. 1. The plating operation is continued for the length of time required to deposit the amount of core metal necessary to form a core 20 of the desired size. At this point, the web is removed from the plating cell 34 and introduced into the next plating cell 42.

Plating cell 42 contains an appropriate electrolyte and the anode 44 which is a platable catalytic metal such as platinum or one of the other catalyst metals previously mentioned. The anode 44 is connected to the direct current power source 46 which is also connected to the contact roller 48. The metal from the anode 44 is now deposited on the surface of the nodules that had been formed in plating cell 34 to form the catalyst metal coating 24 illustrated in FIG. 1. After the desired thickness of catalyst metal has been deposited, the web is removed from the cell 42 after which it may be washed or otherwise treated as appropriate. The resultant product is a web of aluminum with an anodic oxide coating and the attached particles of a core metal coated with a thin layer of catalytic metal extending above the anodic oxide coating. This web may be cut and shaped as desired depending upon the particularly catalytic application. This product is particularly applicable where a multifunctional catalyst is required because it incorporates both an alumina (aluminum oxide) or titania (titanium oxide) catalyst and a metal catalyst such as platinum.

FIG. 2a illustrates an alternative embodiment of the present invention. The source of direct current 60 is connected to the cathode 28 in the anodizing cell 26 and to the anode 36 in the plating cell 34. In this way, one source of direct current is utilized for both process cells and the need for contact rollers for these two cells is eliminated. In this FIG. 2a embodiment as well as the FIG. 2 embodiment, conventional anodizing and plating electrolytes are used in the cells and conventional anodizing and plating temperatures, current densities and times are employed. Also as an alternative, the platable catalyst coating can be deposited onto the first core metal by known electroless, chemical plating processes using a salt bath of the metal to be deposited. In such a case, the plating cell 42 would not require the power source 46.

Figure 3:
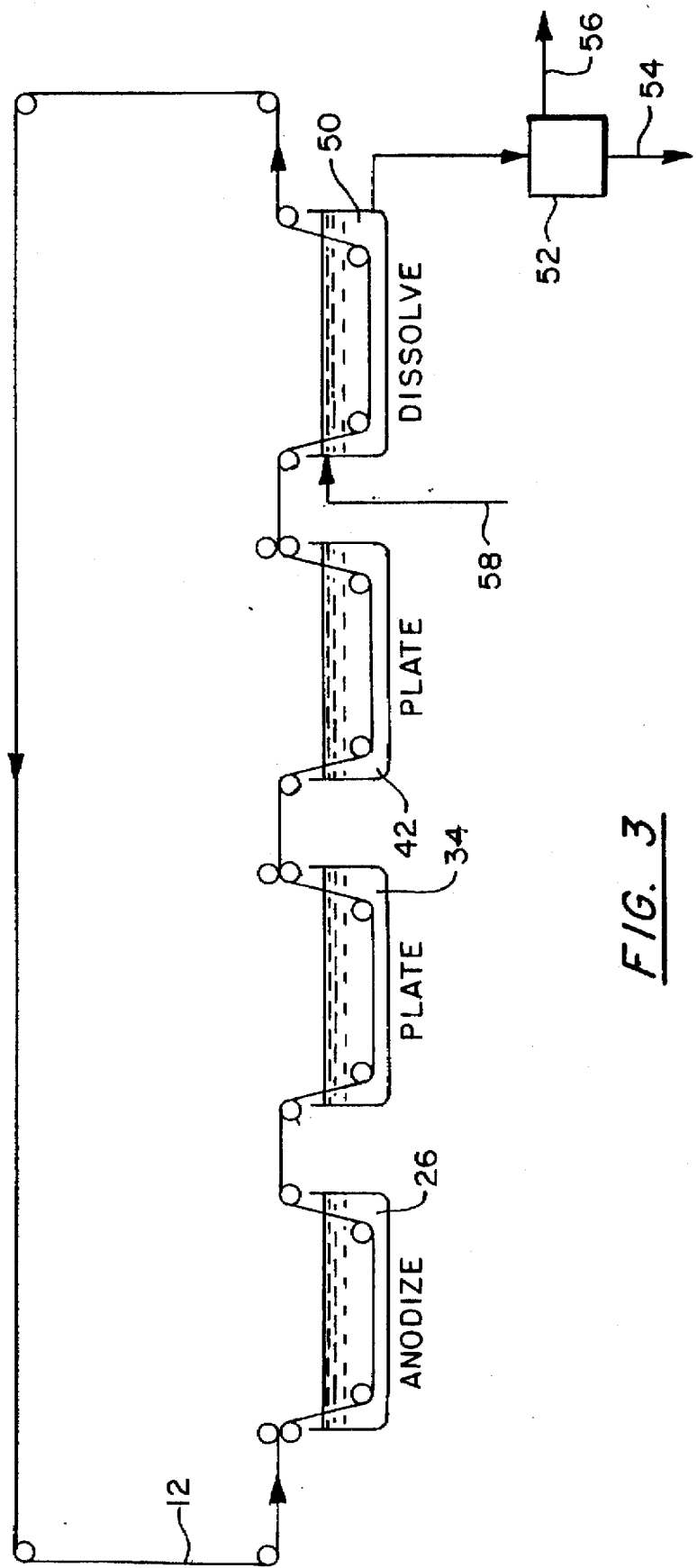

Another aspect of the present invention is that the particles that have been formed with the catalyst coating can be liberated from the web to form a catalyst powder. This aspect of the invention employs the procedure disclosed in the previously mentioned U.S. Pat. No. 4,014,756 and is diagrammatically represented in FIG. 3 hereof. After the plating cell 42, the web with the attached metal particles is fed to the dissolving cell 50 which contains a caustic alkali, such as sodium hydroxide, that will attack and destroy the porous oxide surface 14 but will not affect the metal particles. Destroying the oxide surface 14 frees the roots 20 of the particles from the web and produces liberated particles. The spent caustic solution containing the suspended liberated particles is continuously or periodically withdrawn from the dissolving cell 50 and fed to the separating means 52 which may, for example, be a centrifuge in combination with washing and drying means to remove the dried catalyst powder at 54 and the spent caustic at 56. Fresh caustic 58 is fed to the dissolving cell 50. As illustrated, the aluminum web may be recycled through the operation.

We claim:

1. A process for making catalyst metal particles having a core formed of a first metal and a coating thereon of a second catalyst metal comprising the steps of:
   a. forming a porous anodic oxide layer on a substrate metal surface;
   b. electrolytically depositing said first metal into the pores of said porous anodic oxide layer and continuing said electrolytic deposition to form nodules of said first metal anchored in said pores and extending above the surface of said anodic oxide layer;
   c. depositing said second metal onto said nodules of said first metal to form particles anchored to said substrate metal surface and having a coating thereon of said second metal, said second metal being a catalyst metal and being a metal different from said first metal.

2. A process as recited in claim 1 wherein said substrate is selected from the group consisting of aluminum and titanium and said anodic oxide layer is the corresponding metal oxide.

3. A process as recited in claim 1 and further including the step of removing said anodic oxide layer from said substrate whereby said anchored particles are liberated from said substrate and form a powder.

4. A process as recited in claim 3 wherein said anodic oxide layer is removed by subjecting said anodic oxide layer to a caustic alkali.

5. A process as recited in claim 4 wherein said caustic alkali is sodium hydroxide.

6. A process as recited in claim 2 and further including the step of removing said anodic oxide layer from said substrate whereby said anchored particles are liberated from said substrate and form a powder.

7. A process as recited in claim 1 wherein said substrate metal is aluminum bonded to steel.

8. A process as recited in claim 1 wherein said step of depositing said second metal comprises coating only said nodules thereby leaving said anodic oxide uncoated and wherein said anodic oxide is aluminum oxide and further including the step of treating said aluminum oxide so as to convert it to gamma aluminum oxide.

9. A process as recited in claim 1 wherein said step of depositing said second metal comprises the step of electrodeposition.

10. A process as recited in claim 1 wherein said step of depositing said second metal comprises the step of electroless chemical deposition.

11. A composite catalytic material comprising:
   a. an anodizeable substrate metal;
   b. an anodic catalytic oxide layer having pores therein on a surface of said substrate;
   c. nodules of a first metal anchored in said pores and extending above the surface of said anodic catalytic oxide layer; and
   d. a second metal or metal oxide deposited onto said nodules wherein said second metal or metal oxide is a catalyst material and is different from said first metal.

12. A catalytic material as recited in claim 4, wherein said substrate metal is selected from the group consisting of aluminum and titanium and said anodic catalytic oxide layer is the corresponding metal oxide.

13. A catalytic material as recited in claim 11, wherein said first metal is selected from the group consisting of copper and chromium.

14. A catalytic material as recited in claim 12, wherein said first metal is selected from the group consisting of copper and chromium.

15. A catalytic material as recited in claim 11, wherein said second metal or metal oxide is selected from the group consisting of palladium, platinum, ruthenium, iridium, rhodium, rare earth metals and oxides thereof.

16. A catalytic material as recited in claim 12 wherein said second metal or metal oxide is selected from the group consisting of palladium, platinum, ruthenium, iridium, rhodium, rare earth metals and oxides thereof.

17. A catalytic material as recited in claim 13, wherein said second metal or metal oxide is selected from the group consisting of palladium, platinum, ruthenium, iridium, rhodium, rare earth metals and oxides thereof.

18. A catalytic material as recited in claim 14, wherein said second metal or metal oxide is selected from the group consisting of palladium, platimun, ruthenium, iridium, rhodium, rare earth metals and oxides thereof.

19. A process for making catalytic nodules having a core formed of a non-catalytic metal and a coating thereon of a catalytic material comprising the steps of:
   a. forming a porous anodic oxide layer on a substrate metal surface;
   b. electrolytically depositing said non-catalytic metal into the pores of said porous anodic oxide layer and continuing said electrolytic deposition to form nodules of said non-catalytic metal anchored in said pores and extending above the surface of said anodic oxide layer;
   c. depositing a catalytic metal onto said nodules of said non-catalytic metal to form nodules anchored to said substrate and having a coating thereon of said catalytic material.

20. A process as recited in claim 19 wherein said catalytic metal is selected form the group consisting of palladium, platinum, ruthenium, iridium, rhodium and rare earth metals.

21. A process as recited in claim 19 and further including the step of removing said anodic oxide layer from said substrate whereby said anchored nodules are liberated from said substrate and form a catalytic powder.

22. A process as recited in claim 19 wherein said step of depositing said second metal comprises coating only said nodules thereby leaving said anodic oxide uncoated and wherein said anodic oxide is aluminum oxide and further including the step of treating said aluminum oxide so as to convert it to gamma aluminum oxide.

23. A process for making catalytic nodules as recited in claim 19 and further including the step of calcining to convert said catalytic metal to a catalytic metal oxide.

24. A process as recited in claim 22 wherein said step of treating said aluminum oxide converts said catalytic metal to a catalytic metal oxide.

* * * * *